US012633525B2

(12) United States Patent
Song et al.

(10) Patent No.: US 12,633,525 B2
(45) Date of Patent: May 19, 2026

(54) POSITIVE ELECTRODE ADDITIVE FOR LITHIUM SECONDARY BATTERY, METHOD FOR PREPARING THE SAME AND POSITIVE ELECTRODE FOR LITHIUM SECONDARY BATTERY INCLUDING THE SAME

(71) Applicants: Hyundai Motor Company, Seoul (KR); Kia Corporation, Seoul (KR); University-Industry Cooperation Group of Kyung Hee University, Yongin (KR)

(72) Inventors: Chang Hoon Song, Seoul (KR); Yoon Sung Lee, Suwon (KR); Sung Ho Ban, Hwaseong (KR); Sang Hun Lee, Paju (KR); Yong Hoon Kim, Daejeon (KR); Ko Eun Kim, Cheongju (KR); Da Bin Jang, Gwangju (KR); Ha Eun Lee, Incheon (KR); Hui Beom Nam, Hwaseong (KR); Jun Ki Rhee, Suwon (KR); Seung Min Oh, Incheon (KR); Sung Min Park, Hanam (KR); Hyo Bin Lee, Jeollanam-do (KR); Tae Hee Kim, Yongin (KR); Min Sik Park, Suwon (KR)

(73) Assignees: Hyundai Motor Company, Seoul (KR); Kia Corporation, Seoul (KR); University-Industry Cooperation Group of Kyung Hee University, Gyeonggi-do (KR)

( * ) Notice: Subject to any disclaimer, the term of this patent is extended or adjusted under 35 U.S.C. 154(b) by 517 days.

(21) Appl. No.: 18/137,252

(22) Filed: Apr. 20, 2023

(65) Prior Publication Data
US 2024/0055582 A1    Feb. 15, 2024

(30) Foreign Application Priority Data

Aug. 9, 2022    (KR) ........................ 10-2022-0099408

(51) Int. Cl.
H01M 4/36        (2006.01)
H01M 4/04        (2006.01)
        (Continued)

(52) U.S. Cl.
CPC ......... H01M 4/366 (2013.01); H01M 4/0471 (2013.01); H01M 4/485 (2013.01);
        (Continued)

(58) Field of Classification Search
CPC .... H01M 4/366; H01M 4/0471; H01M 4/485; H01M 4/525; H01M 4/5825; H01M 2004/028; H01M 2220/20
See application file for complete search history.

(56) References Cited

U.S. PATENT DOCUMENTS

2019/0260018 A1*  8/2019  Matsuyama ...... H01M 10/0525
2020/0136142 A1   4/2020  Gowda et al.
2022/0246977 A1*  8/2022  Brezesinski .......... H01M 4/525

FOREIGN PATENT DOCUMENTS

EP        3680970 A2 *  7/2020  ............ C01G 53/42
JP    H 10-158017 A    6/1998
        (Continued)

OTHER PUBLICATIONS

T.Q. Duong, "Progress Report—Advanced Battery Materials Research (BMR) Program", Fiscal Year 2017: First Quarter—US Department of Energy.

(Continued)

*Primary Examiner* — Jane J Rhee
(74) *Attorney, Agent, or Firm* — Fox Rothschild LLP

(57)        ABSTRACT

Disclosed are a positive electrode additive material for a lithium secondary battery having an enhancement in atmo-
(Continued)

*100*

*120*

*110* spheric stability, a method for preparing the same, and a positive electrode for a lithium secondary battery including the same. The positive electrode material includes an core including a lithium component, and a coating layer formed on a surface of the core and including a compound having a formula of $LiM'O_3$ wherein M' is Ta or Nb.

13 Claims, 12 Drawing Sheets

(51) Int. Cl.

| | | |
|---|---|---|
| *H01M 4/485* | (2010.01) | |
| *H01M 4/525* | (2010.01) | |
| *H01M 4/58* | (2010.01) | |
| *H01M 4/02* | (2006.01) | |

(52) U.S. Cl.
CPC ......... *H01M 4/525* (2013.01); *H01M 4/5825* (2013.01); *H01M 2004/028* (2013.01); *H01M 2220/20* (2013.01)

(56) References Cited

FOREIGN PATENT DOCUMENTS

| | | |
|---|---|---|
| JP | 2001-223009 A | 8/2001 |
| KR | 10-2014-0137718 A | 12/2014 |
| KR | 10-2016-0083227 A | 7/2016 |
| KR | 10-2018-0123369 A | 11/2018 |
| KR | 10-2021-0058715 A | 5/2021 |

OTHER PUBLICATIONS

D.P. Abraham et al., "Next-Gen Lithium-Ion: Advanced Cathodes R&D", FY 2017—Annual Progress Report, pp. 468-743.

* cited by examiner

_100_

120

110

Intensity
(a.u.)

2θ (degrees)

POSITIVE ELECTRODE ADDITIVE FOR LITHIUM SECONDARY BATTERY, METHOD FOR PREPARING THE SAME AND POSITIVE ELECTRODE FOR LITHIUM SECONDARY BATTERY INCLUDING THE SAME

CROSS-REFERENCE TO RELATED APPLICATION

This application claims the benefit of Korean Patent Application No. 10-2022-0099408, filed on Aug. 9, 2022, in the Korean Intellectual Property Office, the disclosure of which is incorporated herein by reference.

TECHNICAL FIELD

The present invention relates to a positive electrode additive or positive electrode additive material for a lithium secondary battery, a method for preparing the same, and a positive electrode for a lithium secondary battery including the same. The positive electrode additive material may have an enhancement in atmospheric stability.

BACKGROUND

Secondary batteries have been used as a large-capacity power storage battery for electric vehicles or battery power storage systems and as a small-size high-performance energy source for portable electronic appliances such as a mobile phone, a camcorder, a notebook computer, and the like. Research has been continuously conducted to provide parts with reduced weight and less power consumption of portable electronic appliances for portable electronic devices, and demand for a secondary battery capable of realizing a small size and a high capacity has increased.

In particular, a lithium secondary battery, which is a representative secondary battery, has a high energy density, a large capacity per unit area, a low self-discharge rate, and a long lifespan, as compared to a nickel manganese battery or a nickel cadmium battery. In addition, the lithium secondary battery has no memory effect and, as such, has characteristics of use convenience and a long lifespan.

The lithium secondary battery produces electrical energy through oxidation and reduction reaction occurring when intercalation and deintercalation of lithium ions are performed at a positive electrode and a negative electrode made of active materials allowing intercalation and deintercalation of lithium ions in a state in which an electrolyte is filled between the positive electrode and the negative electrode.

Such a lithium secondary battery includes a positive electrode, an electrolyte, a negative electrode, and the like. In order to secure a long lifespan and reliability of the battery, it is very important to stably maintain interfacial reaction among the constituent elements.

In the lithium secondary battery, the positive electrode thereof is prepared by mixing a binder with a positive electrode active material and a conductive material, and the negative electrode thereof is prepared by mixing a binder with a negative electrode active material and a conductive material. In addition, the positive electrode and the negative electrode may be prepared by further mixing various functional additives with the mixtures prepared as mentioned above, for an enhancement in electrode performance and an enhancement in cell performance.

Meanwhile, various graphite-based materials allowing intercalation and deintercalation of lithium ions have been used as a negative electrode active material for lithium secondary batteries. However, graphite-based materials have difficulty realizing a cell having a high energy density because graphite-based materials have a low theoretical capacity (372 mAh/g).

In the related art, the research on application of silicon oxide or transition metal oxide capable of realizing a high theoretical capacity to a negative electrode active material has recently been conducted. However, such a negative electrode active material has a problem in that an initial charge loss of about 30% is generated after primary charging due to high irreversibility of the negative electrode active material exhibited upon initial charging.

Meanwhile, in order to solve a limitation in developing a negative electrode active material, in the related art, the research on positive electrode additives applied to overcome irreversible capacity loss of a negative electrode has been proposed. For example, there is a method in which a positive electrode additive including an excessive amount of lithium, such as $Li_2NiO_2$ or $Li_2CuO_2$, is applied to a positive electrode.

Such a positive electrode additive includes an excessive amount of lithium, and lithium oxide also remains at a surface of the positive electrode additive. The lithium excessively included in the positive electrode additive or lithium oxide remaining at the surface of the positive electrode additive easily reacts with moisture or carbon dioxide in the atmosphere, thereby forming a byproduct such as $Li_2CO_3$ or LiOH. Such a byproduct generates gas through sub-reaction thereof with an electrolyte and, as such, causes degradation in electrochemical characteristics of a battery.

The information disclosed in this background section is only for enhancement of understanding of the general background of the invention and should not be taken as an acknowledgement or any form of suggestion that this information forms the prior art already known to a person skilled in the art.

SUMMARY

In preferred aspects, provided are a positive electrode additive material for a lithium secondary battery having an enhancement in atmospheric stability, for example, by suppressing formation of a byproduct such as $Li_2CO_3$ and LiOH at a surface thereof and having excellent electrochemical characteristics thereof. Also provided are a method for preparing the positive electrode additive material, and a positive electrode for a lithium secondary battery including the positive electrode additive material.

It will be appreciated by persons skilled in the art to which the present invention pertains that technical problems to be solved by the present invention are not limited to the above-described technical problems, and other technical problems will be more clearly understood from the following description.

In an aspect, provided is a positive electrode additive material for a lithium secondary battery including a core including a lithium component, and a coating layer formed on a surface of the core and including a compound having a formula of $LiM'O_3$ wherein M' is Ta or Nb.

The term "lithium component" as used herein refers to a compound (e.g., covalent compound, ionic compound, or salt) including one or more lithium atoms in its molecular formula. Preferred lithium components may include oxide compound or salt form thereof (e.g., lithium-metal oxide), which can form particles and exist stable in a solvent system (e.g., aqueous solution, alcohol or polar aprotic solvent).

The core may include a compound having a formula of $Li_2MO_2$ wherein M is Ni or Cu.

The core may preferably include $Li_2NiO_2$, and the coating layer may preferably include $LiTaO_3$.

The coating layer may be formed through a reaction of $LiOH$ and $Ta_2(OC_2H_5)_{10}$ as a coating material precursor. For example, $LiOH$ may be present at the surface of the core.

The coating layer may be an amount of about 1 to 7 wt % with respect to 100 wt % of the core.

In another aspect, provided is a method for preparing a positive electrode additive. The method includes steps comprising: preparing a core including a lithium component, providing a Ta-based coating material precursor for formation of a coating layer, and forming a coating layer on a surface of the core by reacting the coating material precursor with the surface of the core.

Preferably, the core may include a compound having a formula of $Li_2MO_2$ wherein M is Ni or Cu, in a powder state formed by reacting $Li_2O$ and a metal precursor including Ni or Cu.

The core is prepared by steps including: preparing an admixture comprising $Li_2O$ and the metal precursor, and pelletizing the admixture; and heating the admixture in an inert atmosphere, thereby obtaining the core.

Preferably, the Ta-based coating material precursor may include $Ta_2(OC_2H_5)_{10}$.

The coating layer may be formed by steps comprising: dispersing the core and the Ta-based coating material precursor in a solvent; producing a reaction product comprising a coating layer on the surface of the core by reacting the core and the Ta-based coating material precursor dispersed in the solvent; drying the solvent and the reaction product in an inert atmosphere; and heating the dried reaction product thereby producing the positive electrode additive material in a form of powder.

The coating layer may be formed through reaction of $LiOH$ with $Ta_2(OC_2H_5)_{10}$ provided as the coating material precursor. For example, $LiOH$ may be present at the surface of the core.

In another aspect, provided is a positive electrode for a lithium secondary battery including the positive electrode additive material as described herein.

The positive electrode may further include a conductive material and a binder.

In another aspect of the present invention, provided is a lithium secondary battery including the positive electrode as described herein.

The lithium secondary battery may further include a negative electrode including a negative active material, and an electrolyte.

Also provided is a vehicle including the lithium secondary battery described herein.

Other aspects of the invention are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
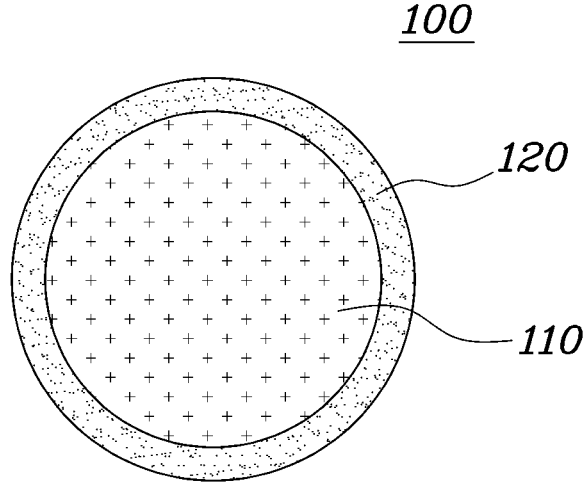
FIG. 1 shows an exemplary positive electrode additive material for a lithium secondary battery according to an exemplary embodiment of the present invention.

Hereinafter, embodiments of the present invention will be described in detail with reference to the accompanying drawings, and the same or similar elements are designated by the same reference numerals regardless of the numerals in the drawings and redundant description thereof will be omitted.

In the following description of the embodiments of the present invention, a detailed description of known functions and configurations incorporated herein will be omitted when it may obscure the subject matter of the embodiments of the present invention. In addition, the embodiments of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention It will be understood that, although the terms "first," "second," etc. may be used herein to describe various elements, these elements should not be limited by these terms. These terms are only used to distinguish one element from another.

Unless clearly used otherwise, singular expressions include a plural meaning.

In this specification, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows an exemplary positive electrode additive material for a lithium secondary battery according to an exemplary embodiment of the present invention.

The positive electrode additive according to the exemplary embodiment of the present invention, which is designated by reference numeral "100", is a positive electrode additive used to prepare a positive electrode of a lithium secondary battery and includes an lithium component core 110, and a functional coating layer 120 formed at a surface of the core 110. In this case, the positive electrode additive may be applied as a positive electrode active material for forming a positive electrode.

Preferably, the lithium component in the core 110 may be formed of a compound having a formula of $Li_2MO_2$ wherein M is Ni or Cu.

For example, $Li_2NiO_2$ or $Li_2CuO_2$, which is used as the core 110, is an additive material applied to overcome irreversible capacity loss of a negative electrode. Preferably, $Li_2NiO_2$ be applied as the core 110.

Preferably, the coating layer 120 may be formed of a compound having formula of $LiM'O_3$ wherein M' is Ta or Nb.

The coating layer 120 may be formed of a material produced through reaction of lithium, LiOH or lithium oxide present on the surface of the core 110 with $Ta_2(OC_2H_5)_{10}$ provided as a coating material precursor, and may be formed of, for example, $LiTaO_3$.

The coating layer 120 may be suitably about 1 to 7 wt %, or particularly 3 to 7 wt %, with respect to 100 wt % of the core 110.

When the formation amount of the coating layer 120 is about 1 wt % or greater, or particularly 3 wt % or greater, effects of suppressing degradation in atmospheric stability and degradation in electrochemical characteristics caused by formation of the coating layer 120 may be sufficiently expected. On the other hand, when the formation amount of the coating layer 120 is greater than 7 wt %, the coating layer 120 may have an excessively great thickness and, as such, effects according to addition of the positive electrode additive may be degraded.

The positive electrode for the lithium secondary battery is configured through further inclusion of a conductive material and a binder, together with the above-described positive electrode additive.

In addition, the lithium secondary battery is configured through inclusion of a negative electrode including a negative electrode active material and an electrolyte, together with the above-described positive electrode.

Hereinafter, a method for preparing the positive electrode additive formed as described above will be described.

A method for preparing a positive electrode additive material includes a core preparation step of preparing a core including a lithium component, a coating material precursor preparation step of preparing a Ta-based coating material precursor, for formation of a coating layer, and a coating step of forming a coating layer at a surface of the prepared additive core by reacting the coating material precursor with the surface of the core.

In the core preparation step, the core including a compound having a formula of $Li_2MO_2$ wherein M is Ni or Cu, in a powder state may prepared by reacting $Li_2O$ and a metal precursor comprising Ni or Cu.

The core preparation step may further include a core pelletization procedure for preparing an admixture by mixing $Li_2O$ and the metal precursor comprising Ni or Cu, and pelletizing the admixture, subsequently and a core firing procedure for firing the admixture by heating the admixture in an inert atmosphere, thereby obtaining the core.

In the core pelletization procedure, $Li_2O$ and the metal precursor comprising Ni or Cu may be dry mixed with each other, and the admixture may be then pelletized.

In the core firing procedure, the pelletized core material may be put into a firing furnace, and may be then maintained for about 17 hours at an atmosphere temperature of the firing furnace increased to a temperature of about 700° C. at a rate of about 5° C. per minute and, as such, is fired. Thereafter, the fired core product is cooled, and then pulverized and, as such, a core in a powder state is obtained.

In the coating material precursor preparation step, formation of a byproduct, such as $Li_2CO_3$ or LiOH, at a surface of the core may be prevented due to reaction of an excessive amount of lithium, LiOH or lithium oxide present at the surface of the core.

As a Ta-based coating material precursor used in this step, $Ta_2(OC_2H_5)_{10}$ may be applied.

In the coating step, a functional coating layer may be formed on the surface of the core from a reaction if an excessive amount of lithium, LiOH or lithium oxide present on the surface of the core with the prepared Ta-based coating material precursor, for example, $Ta_2(OC_2H_5)_{10}$.

The coating step includes a dispersion procedure for dispersing the prepared core and the coating material precursor in a solvent, a reaction procedure for reacting the core and the coating material precursor dispersed in the solvent, for example, by stirring the reaction, thereby producing a reaction product with a coating layer formed at the core, a drying procedure for drying the solvent, in which the reaction product has been produced, in an inert atmosphere, and a firing procedure for firing the dried reaction product, thereby producing an additive in the form of powder.

In the dispersion procedure, a Ta-EtOH solution may be first prepared by dispersing the Ta-based coating material precursor, for example, $Ta_2(OC_2H_5)_{10}$, in anhydrous ethanol as a solvent.

The prepared core may be then put into the prepared Ta-EtOH solution.

In the reaction procedure, for example, lithium, LiOH or lithium oxide present on the surface of the core and $Ta_2(OC_2H_5)_{10}$ provided as the coating material precursor may react, while being stirred in the Ta-EtOH solution for 5 hours.

In the drying procedure, the solvent, such as the anhydrous ethanol, may be removed or evaporated, and then the reaction product may be dried, for example, in an inert atmosphere for 12 hours.

In the firing procedure, the dried reaction product may be put into a glove box, and may be then maintained for about 5 hours at an atmosphere temperature of the glove box increased to a temperature of about 600° C. at a rate of about 5° C. per minute, by firing or heating. Thereafter, the fired positive electrode additive product may be cooled, and then pulverized and, as such, a positive electrode additive in a powder state is obtained.

EXAMPLE

Hereinafter, the present invention will be described through comparative examples and examples.

In Comparative Example 1, a core not formed with a coating layer was used as a positive electrode additive.

In addition, in Comparative Example 2, only a material for formation of a coating layer was used as a positive electrode additive, without using a core.

Meanwhile, in Examples 1 to 4, a positive electrode additive prepared such that a coating layer is formed at a surface of a core in accordance with an embodiment of the present invention is used. In Examples 1 to 4, coating layers were formed by adjusting formation amounts thereof to be 1 wt %, 3 wt %, 5 wt %, and 7 wt % with respect to 100 wt % of a core, respectively.

Preparation of the comparative examples and the examples is as follows.

Comparative Example 1

For synthesis of a core, $Li_2O$ and an NiO precursor were mixed with each other. The resultant mixture was pelletized, and was then maintained in a firing furnace for 17 hours at a temperature increased to a temperature of 700° C. at a rate of 5° C. per minute. The resultant fired product was cooled and then pulverized and, as such, a core in a powder state was obtained as Comparative Example 1.

Comparative Example 2

For synthesis of a material for formation of a coating layer, a mixture of LiOH and $Ta_2(OC_2H_5)_{10}$ was dispersed in anhydrous ethanol as a solvent, and the anhydrous ethanol was then removed after stirring thereof for 5 hours. The resultant product was dried for 12 hours in a glove box in an Ar atmosphere. Thereafter, the product was maintained for 5 hours at a temperature increased to a temperature of 600° C. at a rate of 5° C. per minute. The resultant fired product was cooled and then pulverized and, as such, a coating layer formation material in a powder state was obtained as Comparative Example 2.

Example 1

For formation of a coating layer in an amount of 1 wt %, a $Ta_2(OC_2H_5)_{10}$ precursor and a core prepared through Comparative Example 1 were dispersed in 3 ml of anhydrous ethanol as a solvent, and the anhydrous ethanol was then removed after stirring thereof for 5 hours. The resultant product was dried for 12 hours in a glove box in an Ar atmosphere. Thereafter, the product was maintained for 5 hours at a temperature increased to a temperature of 600° C. at a rate of 5° C. per minute. The resultant fired product was cooled and then pulverized and, as such, a positive electrode additive in a powder state was obtained as Example 1.

Example 2

As Example 2, a positive electrode additive was obtained in the same manner as in Example 1. However, a coating layer was formed in an amount of 3 wt %.

Example 3

As Example 3, a positive electrode additive was obtained in the same manner as in Example 1. However, a coating layer was formed in an amount of 5 wt %.

Example 4

As Example 4, a positive electrode additive was obtained in the same manner as in Example 1. However, a coating layer was formed in an amount of 7 wt %.

Figure 2:
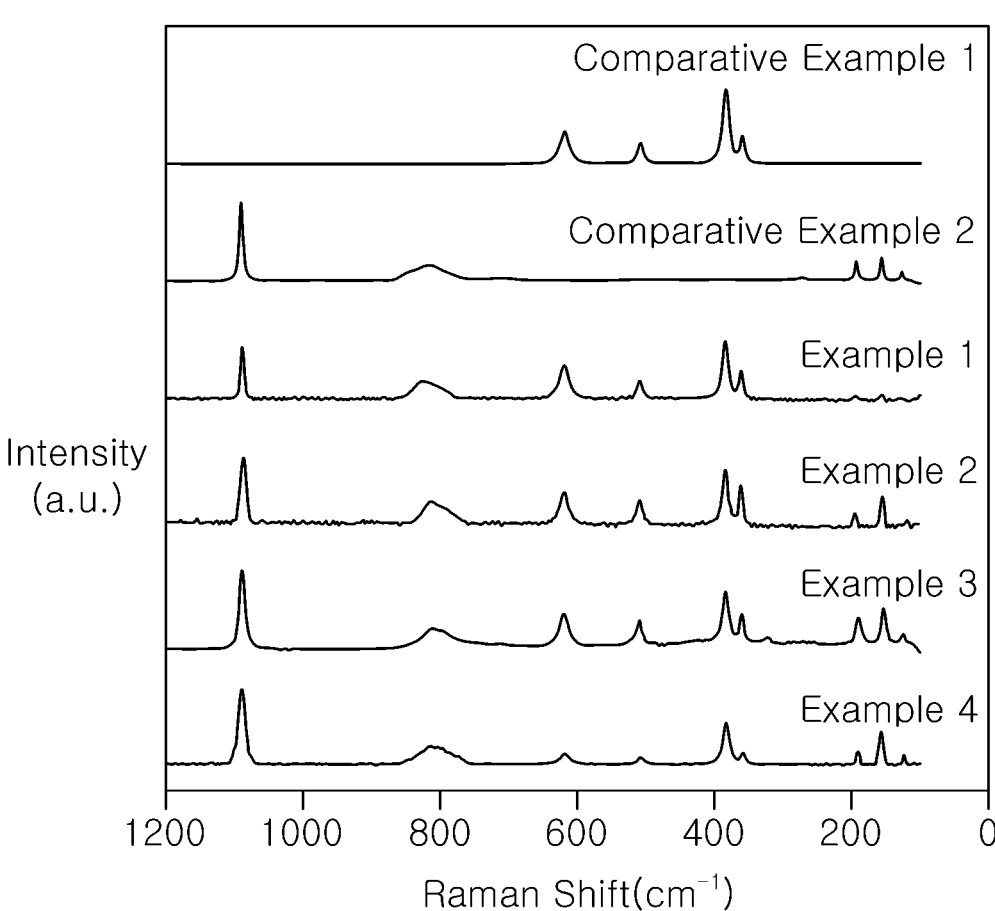
FIG. 2 shows results of Raman analysis for comparative examples and examples.

Raman analysis was performed for Comparative Examples 1 and 2 and Examples 1 to 4 prepared as described above, and results of the analysis are depicted in FIG. 2.

As shown in FIG. 2 and from results of analysis of Examples 1 to 4, a combination of structures of Comparative Examples 1 and 2 was present in Examples 1 to 4.

Figure 3A:
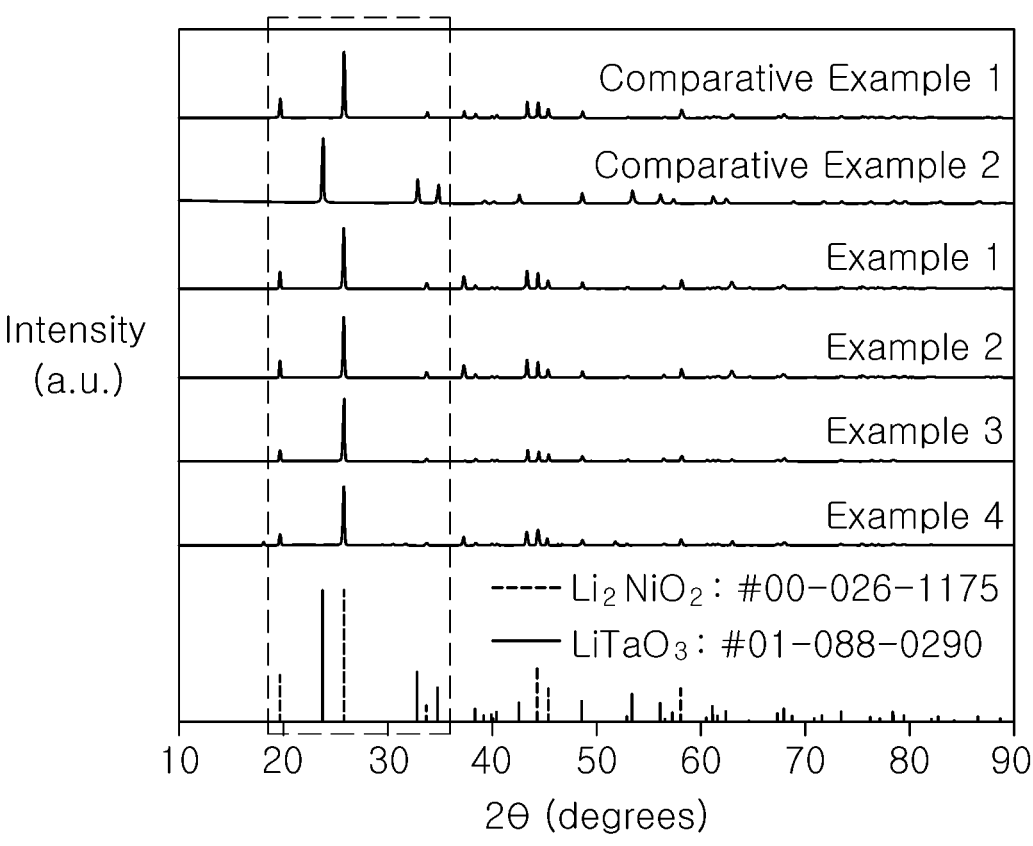
FIGS. 3A and 3B show results of X-ray diffraction analysis for comparative examples and examples.
Figure 3B:
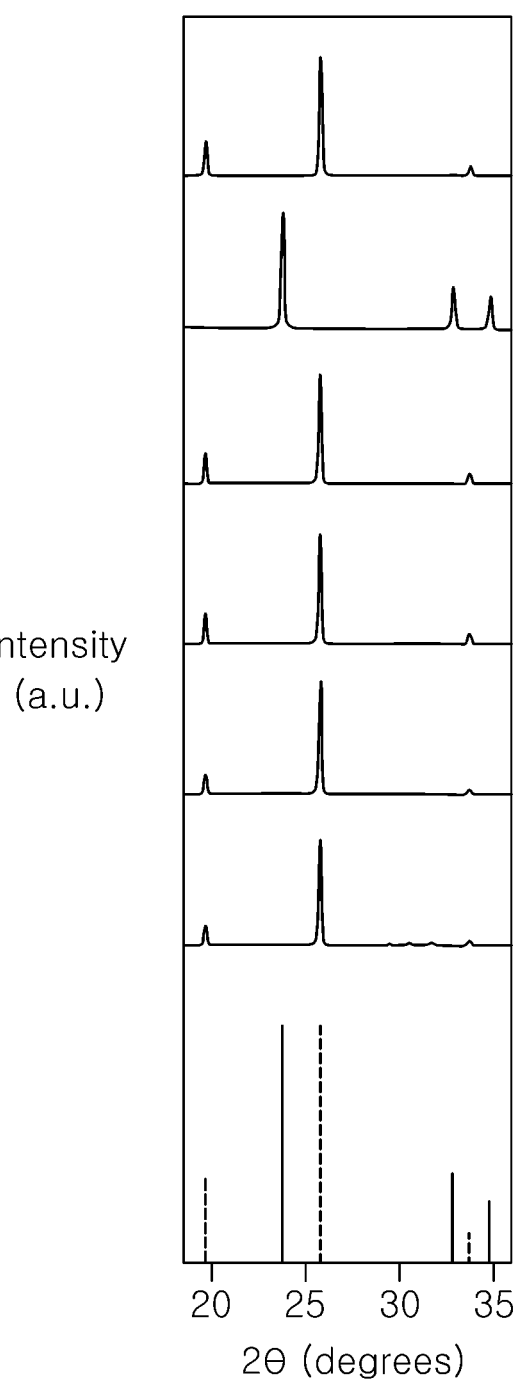

X-ray diffraction analysis was performed for Comparative Examples 1 and 2 and Examples 1 to 4 prepared as described above, and results of the analysis are depicted in FIGS. 3A and 3B. FIG. 3B is an enlarged view of a dotted line box area of FIG. 3A.

As shown in FIGS. 3A and 3B, an existing crystal structure of $Li_2NiO_2$ (Immm, orthorhombic) was present in Comparative Example 1, and a crystal structure of $LiTaO_3$ (R3c, trigonal) was present in Comparative Example 2.

In addition, all of Examples 1 to 4 have the same X-ray diffraction analysis results as that of Comparative Example 1, and an additional impurity and a secondary phase were not formed.

Figure 4:
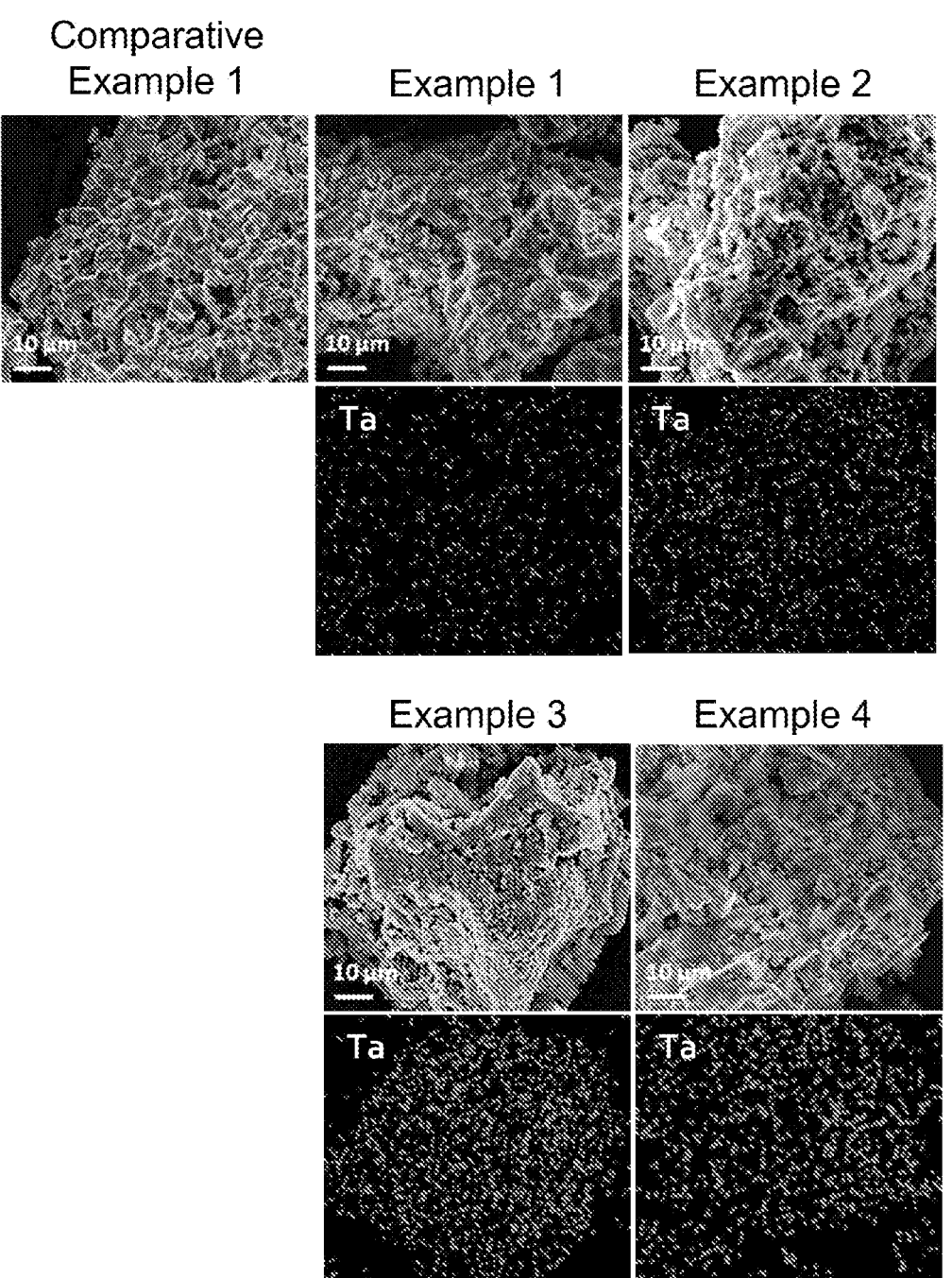
FIG. 4 shows images of scanning electron microscopy (SEM) and results of Ta element distribution analysis through energy dispersive spectroscopy (EDS) for a comparative example and examples.

Results of measurement of photographs of scanning electron microscopy (SEM) and results of measurement of Ta element distribution through energy dispersive spectroscopy (EDS) for Comparative Examples 1 and 2 and Examples 1 to 4 are shown in FIG. 4.

As shown in FIG. 4, a functional coating layer was formed at a particle surface of the positive electrode additive prepared in each of Examples 1 to 4. A uniform Ta element distribution was also seen through EDS mapping.

Figure 5:
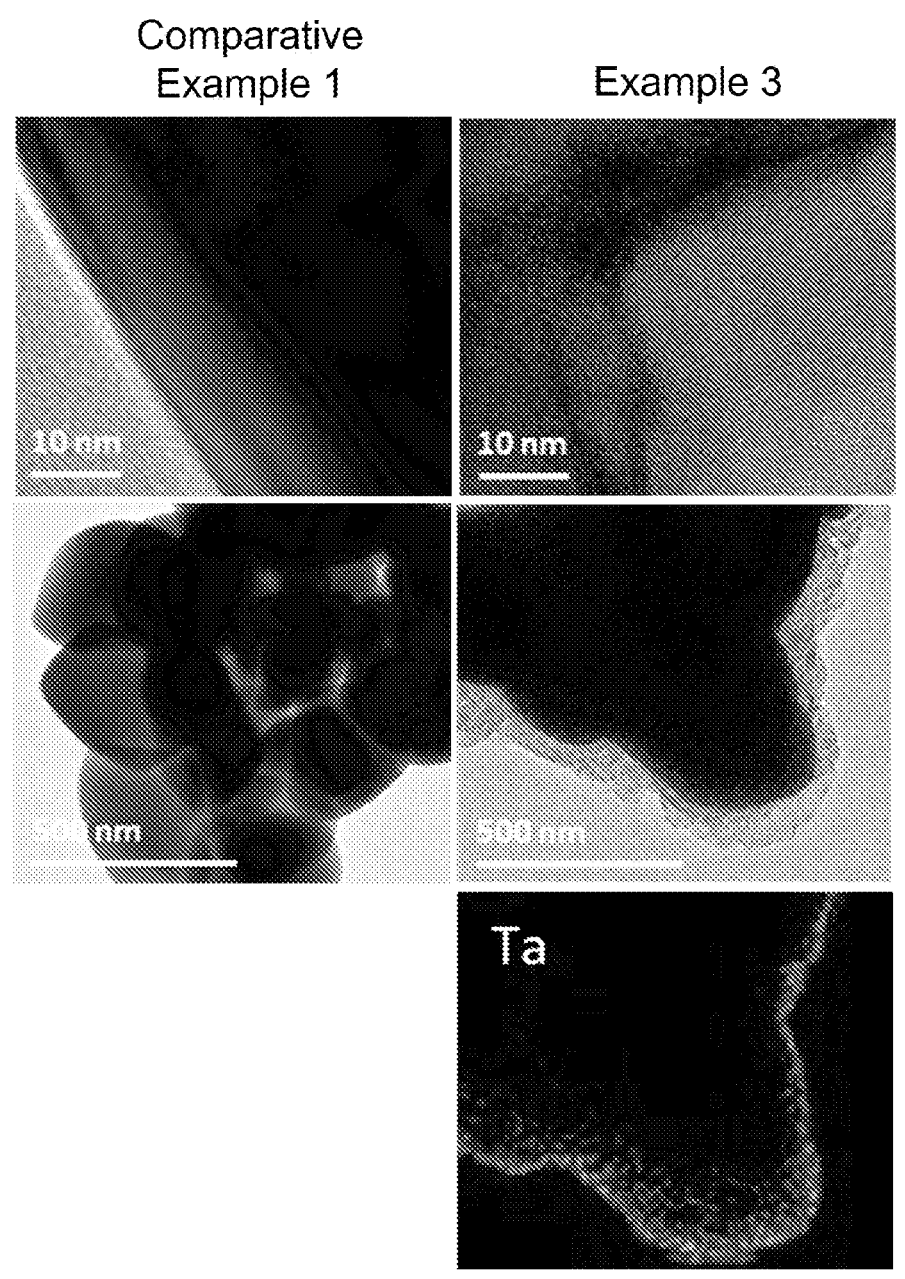
FIG. 5 shows images of transmission electron microscopy (TEM) and results of Ta element distribution analysis through energy dispersive spectroscopy (EDS) for a comparative example and an example.

In addition, results of measurement of photographs of transmission electron microscopy (TEM) and results of measurement of Ta element distribution through energy dispersive spectroscopy (EDS) for Comparative Example 1 and Example 3 are shown in FIG. 5. As shown in FIG. 5, a functional coating layer having a thickness of about 200 nm or less w formed at a surface of the a core prepared in Example 3. A uniform Ta element distribution was also seen through EDS mapping.

Figure 6:
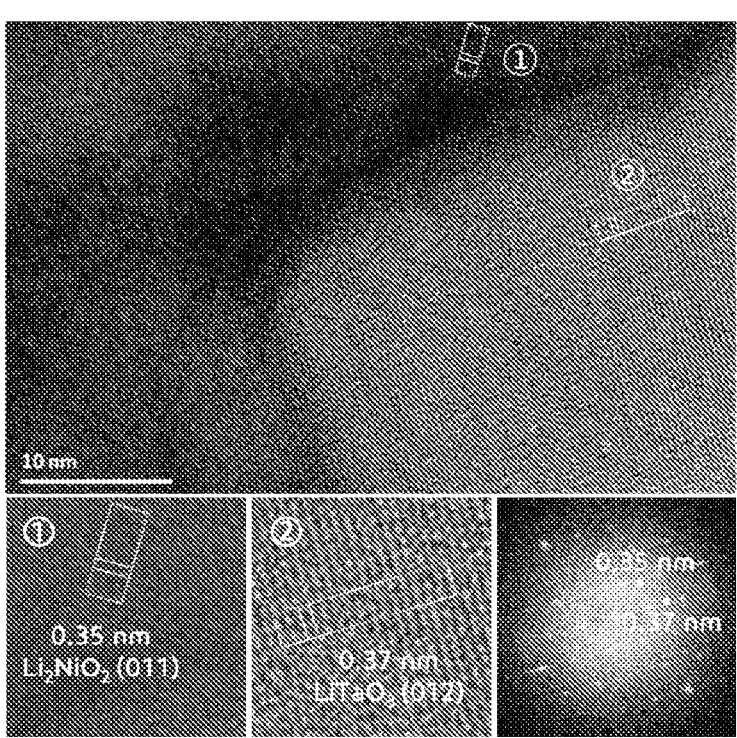
FIG. 6 shows results of high resolution transmission electron microscopy (HRTEM) and FET analysis in an example.
Figure 7:
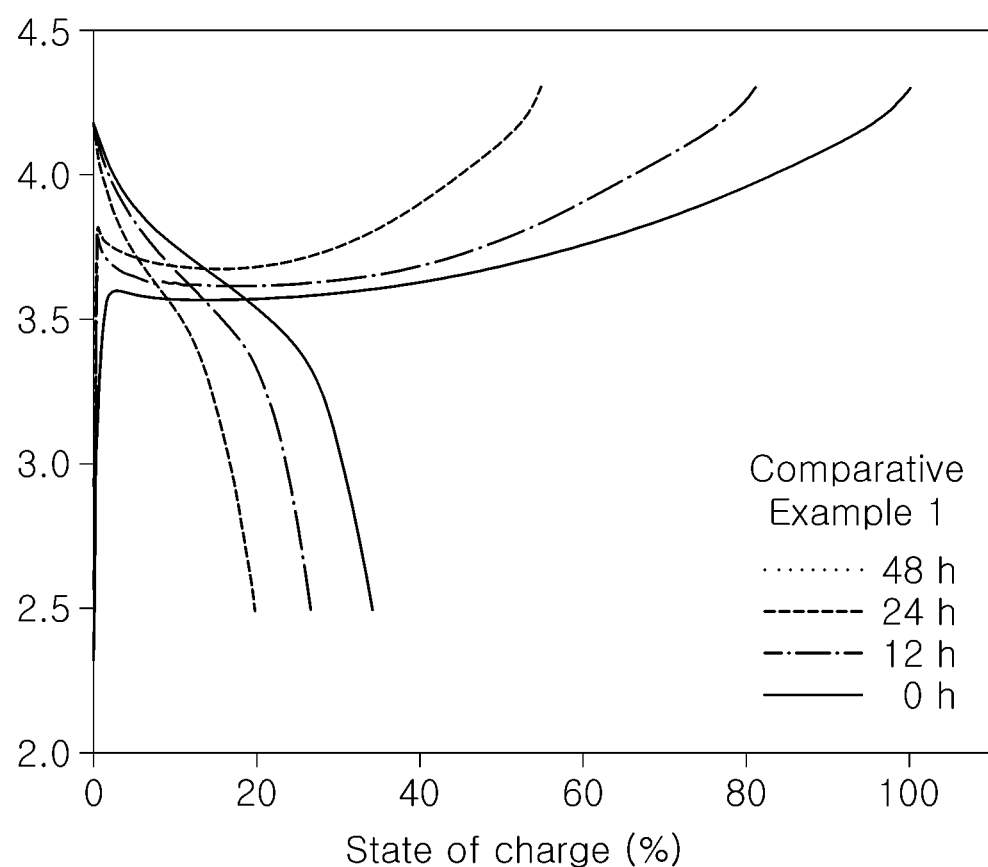
FIGS. 7 to 11 are graphs depicting results of evaluation after exposure to the atmosphere at a relative humidity of 40% for different times.
Figure 8:
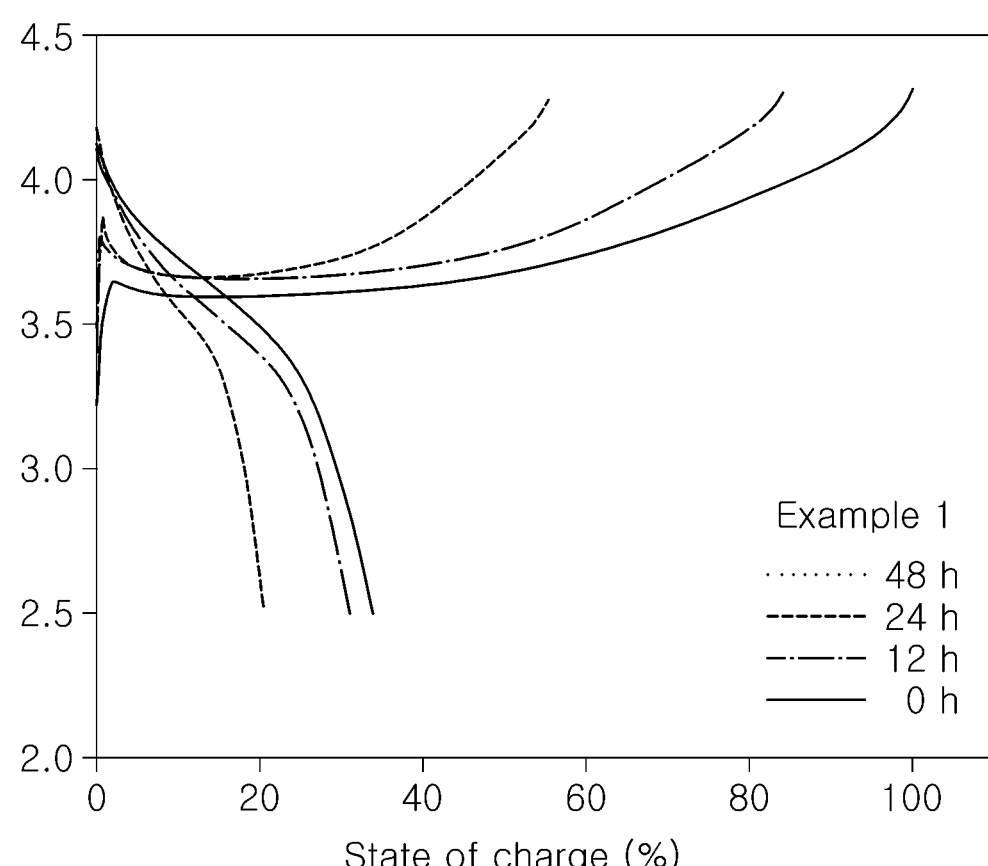
Figure 9:
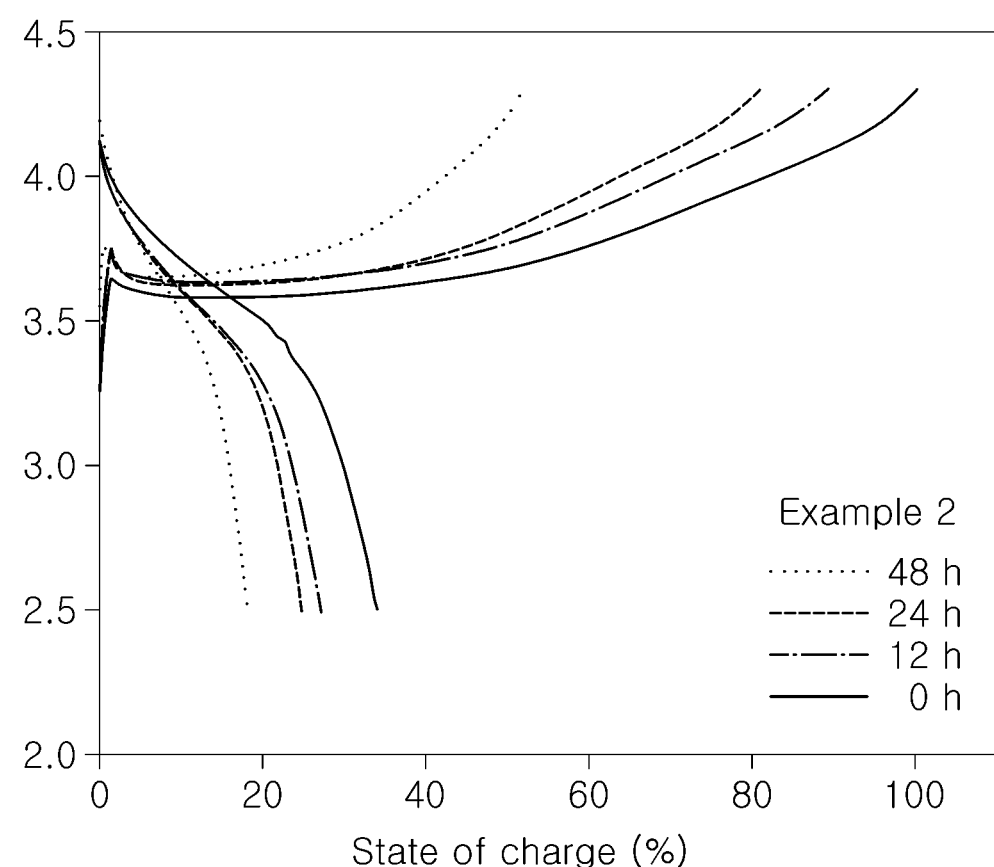
Figure 10:
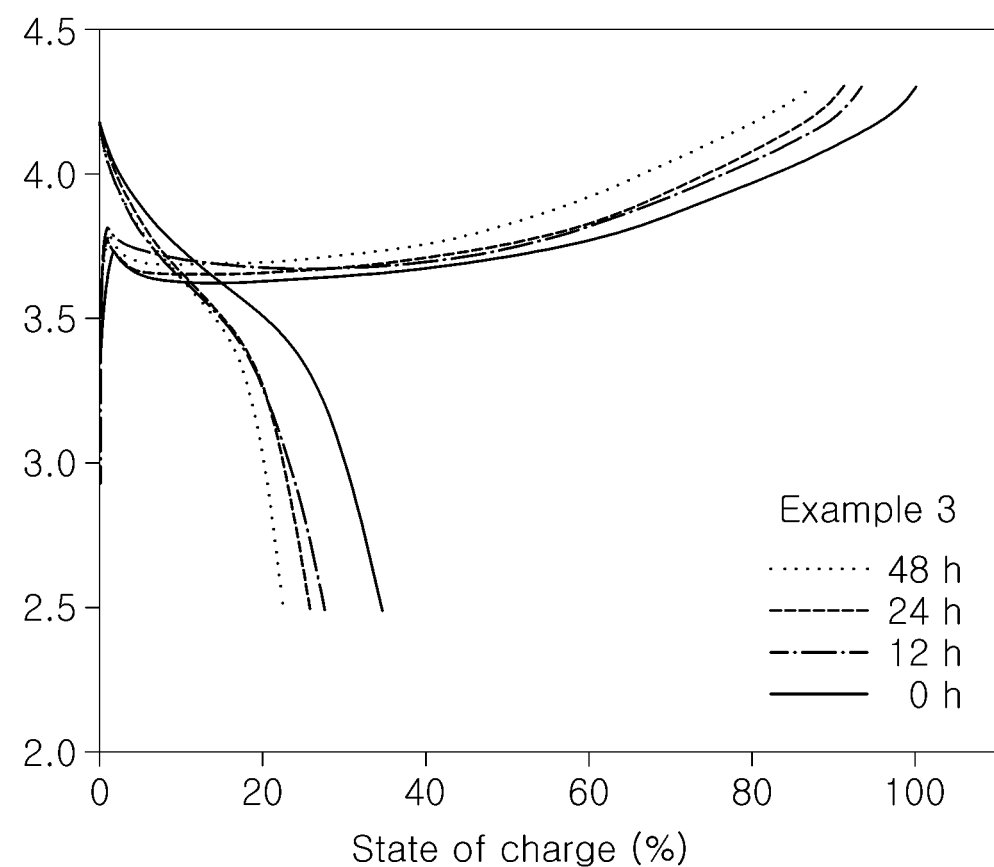
Figure 11:
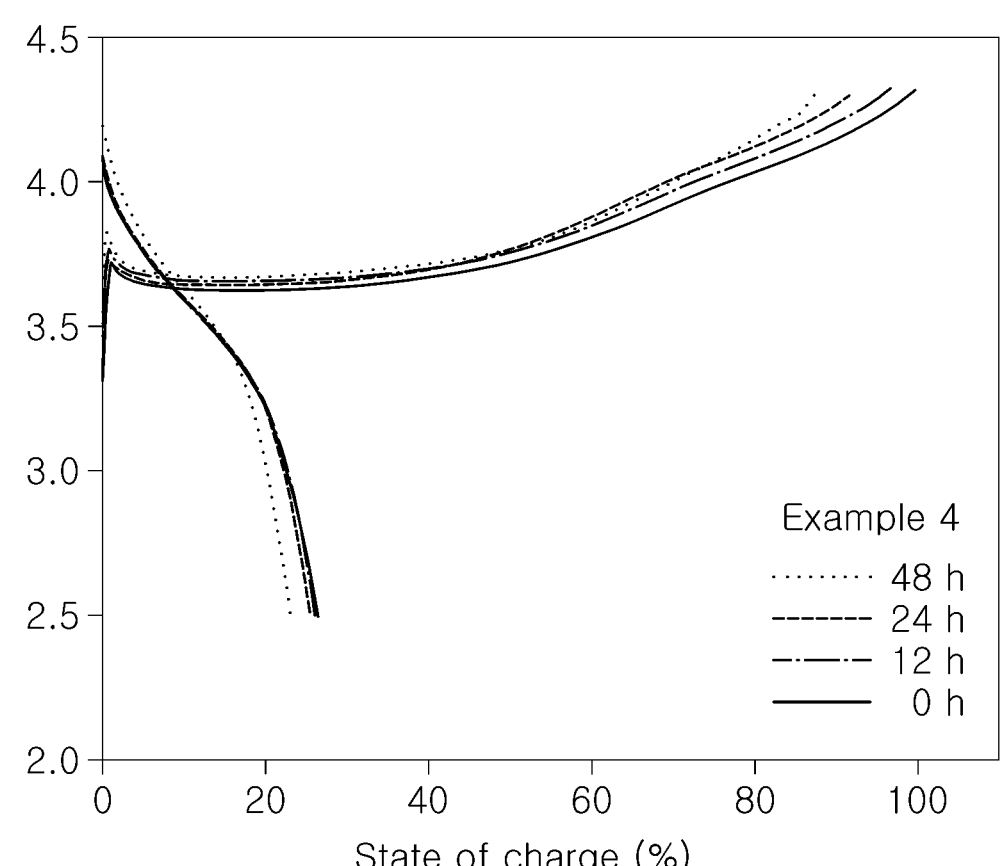

In addition, results of high resolution transmission electron microscopy (HRTEM) and FFT analysis are shown in FIG. 6. As shown in FIG. 6, in conventional cases, an interplanar distance corresponding to (011) planes of $Li_2NiO_2$ was 0.35 nm and an interplanar distance corresponding to (012) planes of $LiTaO_3$ was 0.37 nm.

Electrodes were prepared using Comparative Examples 1 and 2 and Examples 1 to 4, respectively, and coin cells were prepared using the prepared electrodes, respectively. The prepared coin cells were evaluated after exposure thereof to the atmosphere at a relative humidity of 40% for different times.

First, positive electrodes were prepared using Comparative Examples 1 and 2 and Examples 1 to 4.

A positive electrode additive prepared in each case was used as a positive electrode active material, and was then mixed with a carbon black conductive material, a carbon-based additive, and poly(vinylidene fluoride) (PVdF) in a weight ratio of 93:3:1:3 in N-methyl pyrrolidone (NMP) as a solvent, thereby preparing a positive electrode slurry. Thereafter, the positive electrode slurry was coated to a thickness of 50 μm on an aluminum foil, was dried, was roll-pressed, and then dried in vacuum at 120° C. for 12 hours, thereby preparing a positive electrode.

A typical coin cell was then manufactured using the prepared electrode while using, as an electrolyte, a solution in which 1 mole of $LiPF_6$ is dissolved in a solvent including ethylene carbonate (EC) and ethylmethyl carbonate (EMC) mixed with each other in a volume ratio of 1:2.

Thereafter, for the prepared cell, a charge/discharge test was performed at 0.2 C/0.2 C under the condition that charge and discharge voltage ranges were 2.5 to 4.3 V (1.0 C=320 mAh/g).

Results of the test are shown in the following Table 1 and FIGS. 7 to 11.

TABLE 1

| | Exposure | 0 h | 12 h | 24 h | 48 h |
|---|---|---|---|---|---|
| Comparative Example 1 | Charge (%) | 100 | 81 | 54.9 | — |
| Example 1 | Discharge (%) | 34.2 | 26.6 | 19.8 | — |
| Example 1 | Charge (%) | 100 | 84.1 | 55.7 | — |
| | Discharge (%) | 35.3 | 31 | 20.6 | — |
| Example 2 | Charge (%) | 100 | 89.2 | 81 | 51.7 |
| | Discharge (%) | 33.8 | 27.1 | 24.8 | 18.2 |
| Example 3 | Charge (%) | 100 | 93.4 | 91.1 | 87.5 |
| | Discharge (%) | 28.7 | 27.6 | 25.8 | 22.5 |
| Example 4 | Charge (%) | 100 | 96.7 | 92.8 | 87.3 |
| | Discharge (%) | 26.4 | 26.1 | 25.6 | 23.1 |

As shown in Table 1 and FIGS. 7 to 11, in Comparative Example 1, a capacity retention rate of about 81% was exhibited after exposure for 12 hours, and short circuit was generated within a cell after exposure for 48 hours.

Example 1 exhibited an enhanced capacity retention rate in that a capacity retention rate of about 84.1% was exhibited after exposure for 12 hours, but short circuit was generated within a cell after exposure for 48 hours.

On the other hand, in Examples 2 to 4, capacity retention rates of about 89.2%, 93.4%, and 96.7% were exhibited after exposure for 12 hours, respectively, and capacity retention rates of about 51.7%, 87.5%, and 87.3% were exhibited even after exposure for 48 hours, respectively.

As apparent from the above description, according to various exemplary embodiments of the present disclosure, a coating layer may be formed at a surface of a positive electrode additive using a Ta-based coating material precursor reacting with a byproduct, such as $Li_2CO_3$ and LiOH, present at the surface of the positive electrode additive. Accordingly, effects of suppressing degradation in atmospheric stability and degradation in electrochemical characteristics caused by a byproduct such as $Li_2CO_3$ and LiOH may be expected.

In particular, according to various exemplary embodiments of the present disclosure, an effect of forming a functional coating layer such as $LiTaO_3$ at a surface of a positive electrode additive core using lithium remaining at the surface of the core, based on a precursor such as $Ta_2(OC_2H_5)_{10}$, may be expected without provision of a separate lithium precursor.

Accordingly, even when a positive electrode additive used to achieve an enhancement in irreversible capacity, such as $Li_2NiO_2$ or $Li_2CuO_2$, is left in the atmosphere for a long time, it may be possible to suppress formation of a byproduct such as $Li_2CO_3$ and LiOH at the surface of the surface of the positive electrode additive.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A positive electrode additive material for a lithium secondary battery, comprising:
   a core comprising a lithium component; and
   a coating layer formed on a surface of the core and comprising a compound having a formula of $LiM'O3$ wherein M' is Ta or Nb,
   wherein the core comprises a compound having a formula $Li2MO2$ wherein M is Ni or Cu,
   wherein:
   the core comprises $Li2NiO2$; and
   the coating layer comprises $LiTaO3$.

2. The positive electrode additive material according to claim 1, wherein the coating layer is formed through a reaction of lithium, LiOH or lithium oxide present on the surface of core and $Ta2(OC2H5)10$ as a coating material precursor.

3. The positive electrode additive material according to claim 1, wherein the coating layer is in an amount of about 1 to 7 wt % with respect to 100 wt % of the core.

4. A method for preparing a positive electrode additive material of a lithium secondary battery, comprising:
   preparing a core comprising a lithium component;
   providing a Ta-based coating material precursor; and
   forming a coating layer on the surface of the prepared core by reacting the Ta-based coating material precursor with the surface of the core,
   wherein the Ta-based coating material precursor comprises $Ta2(OC2H5)10$.

5. The method according to claim 4, wherein the core comprises a compound having a formula of $Li2MO2$ wherein M is Ni or Cu, in a powder state formed by reacting $Li2O$ and a metal precursor comprising Ni or Cu.

6. The method according to claim 5, wherein the core is prepared by steps comprising:
   preparing an admixture comprising $Li_2O$ and the metal precursor, and pelletizing the admixture; and
   heating the admixture in an inert atmosphere, thereby obtaining the core.

7. The method according to claim 4, wherein the coating layer is formed by steps comprising:
   dispersing the core and the Ta-based coating material precursor in a solvent;

producing a reaction product comprising a coating layer on the surface of the core by reacting the core and the Ta-based coating material precursor dispersed in the solvent;

drying the solvent and the reaction product in an inert atmosphere; and heating the dried reaction product thereby producing the positive electrode additive material in a form of powder.

8. The method according to claim 7, wherein, the coating layer is formed through reaction of lithium, LiOH or lithium oxide present on the surface of the core and Ta2(OC2H5)10 as the coating material precursor.

9. A positive electrode for a lithium secondary battery comprising a positive electrode additive material according to claim 1.

10. The positive electrode according to claim 9, further comprising a conductive material and a binder.

11. A lithium secondary battery comprising a positive electrode according to claim 9.

12. The lithium secondary battery according to claim 11, further comprising:

a negative electrode comprising a negative active material; and an electrolyte.

13. A vehicle comprising a lithium secondary battery according to claim 11.

* * * * *